(12) United States Patent
Moruzzi

(10) Patent No.: US 12,337,422 B2
(45) Date of Patent: Jun. 24, 2025

(54) ADJUSTABLE PIPE CLAMP

(71) Applicant: ESCO Tool, Holliston, MA (US)

(72) Inventor: Benjamin James Moruzzi, Framingham, MA (US)

(73) Assignee: ESCO TOOL, Holliston, MA (US)

( * ) Notice: Subject to any disclaimer, the term of this patent is extended or adjusted under 35 U.S.C. 154(b) by 0 days.

(21) Appl. No.: 17/577,855

(22) Filed: Jan. 18, 2022

(65) Prior Publication Data

US 2023/0226651 A1   Jul. 20, 2023

(51) Int. Cl.
| | | |
|---|---|---|
| *F28F 9/02* | (2006.01) | |
| *B23K 37/0533* | (2025.01) | |
| *B25B 5/14* | (2006.01) | |
| *B25B 27/10* | (2006.01) | |
| *F16L 1/09* | (2006.01) | |

(52) U.S. Cl.
CPC .......... *B23K 37/0533* (2013.01); *B25B 5/147* (2013.01); *B25B 27/10* (2013.01); *F16L 1/09* (2013.01)

(58) Field of Classification Search
CPC ........... B23K 37/0533; B25B 5/17; F16L 1/09
See application file for complete search history.

(56) References Cited

U.S. PATENT DOCUMENTS

| | | | | |
|---|---|---|---|---|
| 2,364,963 | A * | 12/1944 | Bernard | B23K 7/006 |
| | | | | 266/56 |
| 3,252,192 | A * | 5/1966 | Smith | F16L 1/10 |
| | | | | 138/99 |
| 3,711,920 | A * | 1/1973 | Simmons, Jr. | B23K 37/0533 |
| | | | | 29/256 |
| 4,470,291 | A * | 9/1984 | Gibb | B21D 17/02 |
| | | | | 269/902 |

(Continued)

FOREIGN PATENT DOCUMENTS

JP   59066998 A * 4/1984 ......... B23K 37/0533

OTHER PUBLICATIONS cnckitchen.com, "Helicoils, Threaded Insets and Embedded Nuts in 3D Prints—Strength & Strength Assessment", https://www.cnckitchen.com/blog/helicoils-threaded-insets-and-embedded-nuts-in-3d-prints-strength-amp-strength-assessment , May 30, 2020 (Year: 2020).*

*Primary Examiner* — Kiley S Stoner
*Assistant Examiner* — Carlos J Gamino
(74) *Attorney, Agent, or Firm* — Renner, Kenner, Greive, Bobak, Taylor & Weber Co., LPA

(57) ABSTRACT

An adjustable clamp for welding together pipes, the adjustable clamp having a first axis perpendicular to the pipes and a second axis parallel to the pipes. The adjustable clamp includes four clamp corners, four transverse bolts, two parallel bolts, two threaded inserts, and four spaces. Each clamp corner includes a first transverse aperture, a second transverse aperture, and a third parallel aperture. The first (Continued)

and second apertures are transverse relative to the first axis and the third aperture is parallel relative to the first axis. Each transverse bolt is securable within the first and second transverse apertures of the four clamp corners. Each parallel bolt is securable within the third apertures of the four clamp corners. Each threaded insert is placeable within the third apertures of the four clamp corners and each threaded insert is mated with a respective parallel bolt. Each spacer surrounds a portion of each transverse bolt.

6 Claims, 4 Drawing Sheets

(56) References Cited

U.S. PATENT DOCUMENTS

| | | | | |
|---|---|---|---|---|
| 4,493,139 A * | 1/1985 | McClure | ................ | B25B 5/147 |
| | | | | 29/237 |
| 4,635,970 A * | 1/1987 | Haines | .................... | F16L 21/08 |
| | | | | 285/368 |
| 4,722,468 A * | 2/1988 | McClure | ................ | B25B 27/10 |
| | | | | 29/272 |
| 4,846,391 A * | 7/1989 | McClure | .............. | B23K 9/0052 |
| | | | | 228/119 |
| 4,936,500 A * | 6/1990 | McClure | .............. | F22B 37/102 |
| | | | | 228/119 |
| 5,052,608 A * | 10/1991 | McClure | ............ | B23K 37/0533 |
| | | | | 228/49.4 |
| 5,161,828 A * | 11/1992 | Hynes | .................. | E21B 43/013 |
| | | | | 166/347 |
| 5,207,252 A * | 5/1993 | Risse | ...................... | B25B 5/142 |
| | | | | 269/902 |
| 5,934,334 A * | 8/1999 | Gray, Jr. | .................. | F16L 9/18 |
| | | | | 138/108 |
| 6,775,890 B2 * | 8/2004 | Kolarik | .................. | B25B 27/10 |
| | | | | 29/244 |
| 7,195,143 B2 * | 3/2007 | Reeson | ............. | B23K 37/0533 |
| | | | | 228/44.5 |
| 7,322,614 B2 * | 1/2008 | Reeves | ............... | F16L 55/1725 |
| | | | | 285/15 |
| 9,163,760 B2 * | 10/2015 | Lundstrom | ........... | F16L 23/024 |
| 9,808,893 B2 * | 11/2017 | McClure | ................ | B25B 5/147 |
| 10,837,584 B2 * | 11/2020 | Bradberry | .............. | F16L 21/08 |
| 2002/0101017 A1 * | 8/2002 | Kolarik | .................. | B25B 27/10 |
| | | | | 269/43 |
| 2003/0205021 A1 * | 11/2003 | Ryan | ........................ | E04C 3/30 |
| | | | | 52/834 |
| 2006/0087121 A1 * | 4/2006 | Bradley | .................. | F16L 21/08 |
| | | | | 285/415 |
| 2011/0121567 A1 * | 5/2011 | Gentile, Jr. | ........... | F16L 23/032 |
| | | | | 285/368 |
| 2013/0299563 A1 * | 11/2013 | Uecker | ................... | B25B 5/163 |
| | | | | 228/44.5 |
| 2017/0036309 A1 * | 2/2017 | McClure | ............ | B23K 37/0533 |
| 2020/0263810 A1 * | 8/2020 | Comalander | ............. | F16L 3/18 |

* cited by examiner

ADJUSTABLE PIPE CLAMP

FIELD OF THE INVENTION

The present invention relates to a clamp used to assist in welding pipes together. It more particularly relates to an adjustable clamp used to assist in welding pipes together. It specifically relates to an adjustable clamp consisting of four clamp corners securable together such that the overall clamp can be adjusted to fit around pipe ends of varying dimensions.

BACKGROUND OF THE INVENTION

Tools for clamping and aligning boiler tubes when connecting the ends of the boiler tubes by welding are known as disclosed in U.S. Pat. Nos. 4,493,139, 4,579,272 and 4,722,468. The devices disclosed in these patents include structures for securing boiler tube ends in aligned and adjacent relation and function effectively when the boiler tubes are in a spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall.

In addition, and considered relevant to the present invention, are U.S. Pat. Nos. 4,846,391 and 4,936,500, both issued to Gary McClure and disclosing various clamping tools that engage the respective tubes to facilitate welding in the repair of a wall tube or tubes. The '391 patent teaches a clamp having a pair of opposed clamp members that each include a pair of recesses to engage adjacent ends of a pair of boiler wall tubes on opposite sides of a juncture between adjacent ends. The tool includes means for moving the clamps toward one another, thereby generating a secure clamp engagement between the clamps onto the respective tube or tubes. The '500 patent discloses a clamp that is bolted directly onto a boiler tube wall as opposed to utilizing the handle and mounting bar combination disclosed in the '391 patent. However, neither of these patents demonstrates an ability to provide versatility to the user in accommodating varying sizes beyond the dimensions of the recesses provided in the '391 and '500 disclosures. The present invention overcomes this deficiency by providing the user with the ability to use the present invention on variously sized/dimensioned tubes.

SUMMARY OF THE INVENTION

An embodiment of the present invention provides an adjustable clamp for welding together ends of two pipes, wherein the adjustable clamp has a first axis perpendicular to the pipes and a second axis parallel to the pipes, the adjustable clamp comprising: four clamp corners, wherein each clamp corner includes a first transverse aperture, a second transverse aperture, and a third parallel aperture, wherein the first and second transverse apertures are transverse relative to the first axis and the third parallel aperture is parallel relative to the first axis; four transverse bolts securable within the first and second transverse apertures of the four clamp corners; two parallel bolts securable within the third apertures of the four clamp corners; two threaded inserts placeable within the third apertures of the four clamp corners, wherein each threaded insert is mated with a respective parallel bolt; and four spacers, each said spacer surrounding a portion of each transverse bolt.

Another embodiment of the present invention provides an adjustable clamp as in any embodiment above, further comprising four transverse lock nuts, wherein each transverse lock nut is mated with a respective transverse bolt to secure said transverse bolt within a pair of first or second transverse apertures of a pair of clamp corners.

Another embodiment of the present invention provides an adjustable clamp as in any embodiment above, further comprising four transverse washers, wherein each transverse washer is placed adjacent a head of a respective transverse bolt.

Another embodiment of the present invention provides an adjustable clamp as in any embodiment above, further comprising two parallel washers, wherein each parallel washer is placed adjacent a head of a respective parallel bolt.

Another embodiment of the present invention provides an adjustable clamp as in any embodiment above, wherein a first clamp corner is securable to a second clamp corner through the use of a first and second transverse bolt to form a first clamp half and wherein a third clamp corner is securable to a fourth clamp corner through the use of a third and fourth transverse bolt to form a second clamp half.

Another embodiment of the present invention provides an adjustable clamp as in any embodiment above, wherein a first clamp half is securable to a second clamp half through the use of a first parallel bolt and a second parallel bolt.

Another embodiment of the present invention provides an adjustable clamp as in any embodiment above, wherein each spacer of the four spacers has the same spacer length.

Another embodiment of the present invention provides an adjustable clamp as in any embodiment above, wherein the spacer length is selected from 0.16 inches, 0.40 inches, 0.875 inches, or 1.375 inches.

An embodiment of the present invention provides a method of welding together the ends of two pipes comprising the steps of: securing a first clamp corner to a second clamp corner to create a first clamp half; securing a third clamp corner to a fourth clamp corner to create a second clamp half; placing a first end of a first pipe adjacent a first end of a second pipe to create a weldable pipe; placing said first clamp half adjacent a first side of said weldable pipe and said second clamp half adjacent a second side of said weldable pipe; securing said first clamp half to said second clamp half to create an adjustable clamp having a first and second weld window; and welding together said weldable pipe within said first and second weld windows.

Another embodiment of the present invention provides a method of welding together the ends of two pipes as in any embodiment above, wherein each said clamp corner includes a first transverse aperture, a second transverse aperture, and a third parallel aperture, wherein the first and second transverse apertures are transverse relative to a first axis perpendicular to the pipes and the third parallel aperture is parallel relative to the first axis.

Another embodiment of the present invention provides a method of welding together the ends of two pipes as in any embodiment above, wherein said step of securing said first clamp corner to said second clamp corner includes placing a first transverse bolt within the first transverse aperture of said first clamp corner and a second transverse bolt within the second transverse aperture of said first clamp corner, placing a first spacer around the first transverse bolt and a second spacer around the second transverse bolt, placing said first transverse bolt within the first transverse aperture of said second clamp corner and said second transverse bolt within the second transverse aperture of said second clamp;

and securing a first transverse lock nut to an end of said first transverse bolt and a second transverse lock nut to an end of said second transverse bolt.

Another embodiment of the present invention provides a method of welding together the ends of two pipes as in any embodiment above, wherein said step of securing said third clamp corner to said fourth clamp corner includes placing a third transverse bolt within the first transverse aperture of said third clamp corner and a fourth transverse bolt within the second transverse aperture of said third clamp corner, placing a third spacer around the third transverse bolt and a fourth spacer around the fourth transverse bolt, placing said third transverse bolt within the first transverse aperture of said fourth clamp corner and said fourth transverse bolt within the second transverse aperture of said fourth clamp; and securing a third transverse lock nut to an end of said third transverse bolt and a fourth transverse lock nut to an end of said second transverse bolt.

Another embodiment of the present invention provides a method of welding together the ends of two pipes as in any embodiment above, wherein said step of securing said first clamp half to said second clamp half includes placing a first parallel bolt within the third parallel aperture of the first clamp corner of the first clamp half and a second parallel bolt within the third parallel aperture of the second clamp corner of the first clamp half, placing a first threaded insert within the third parallel aperture of the third clamp corner of the second clamp half and a second threaded insert within the third parallel aperture of the fourth clamp corner of the second clamp half, and securing the first threaded insert with the first parallel bolt and the second threaded insert with the second parallel bolt to create the adjustable clamp.

BRIEF DESCRIPTION OF THE DRAWINGS

Additional utility and features of the invention will become more fully apparent to those skilled in the art by reference to the following drawings, which illustrate the primary features of the preferred embodiment and numerous alternative embodiments.

DETAILED DESCRIPTION OF ILLUSTRATIVE EMBODIMENTS

Figure 1:
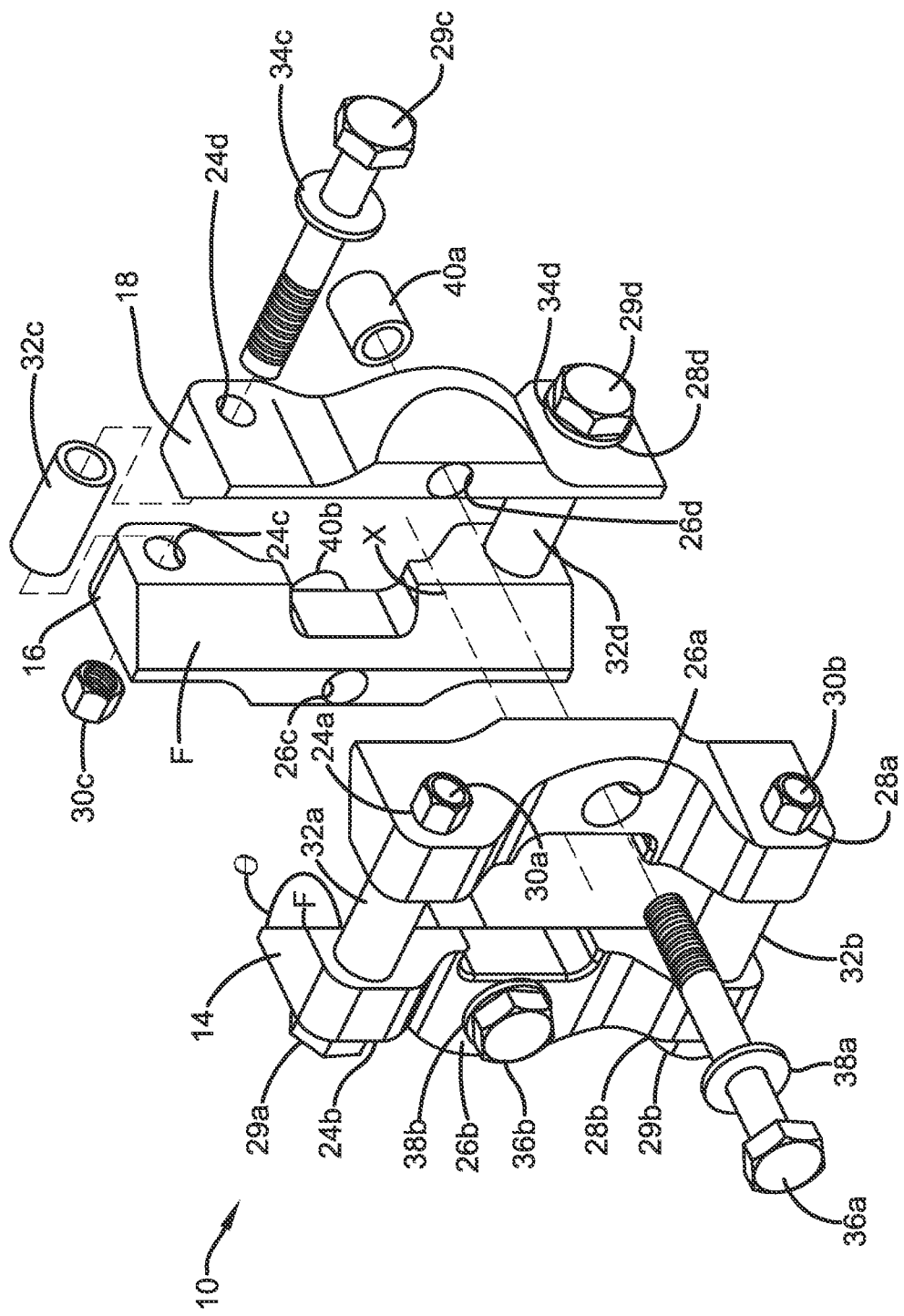
FIG. 1 shows a partially exploded view of the adjustable pipe clamp of the present invention.

The present invention relates to an adjustable pipe clamp 10 as generally shown in FIGS. 1-4. The adjustable pipe clamp 10 of the present invention is utilized to clamp the ends of two pipes P1 and P2 together, such that the ends of the two pipes P1 and P2 are aligned such that they can be welded together. The pipe clamp 10 consists of four clamp corners 12, 14, 16, and 18. The clamp corners 12 and 14 can be secured together to form a first clamp half 20 and the clamp corners 16 and 18 can be secured together to form a second clamp half 22. Each of the clamp corners 12, 14, 16, and 18 include a pipe-facing face F that that forms a 45° angle θ. When the clamp corners 12, 14, 16, and 18 are secured together to form the clamp 10, each pipe-facing face F will be against a surface of one of the two pipes P1 or P2.

As shown in FIG. 1, each clamp corner 12, 14, 16, and 18 contains a first transverse aperture 24a-d, a parallel aperture 26a-d, and a second transverse aperture 28a-d. The first and second transverse apertures 24a-d and 28a-d are transverse to axis X and the parallel apertures 26a-d are parallel to axis X. To secure together clamp corners 12 and 14 to form first clamp half 20, a first transverse bolt 29a is threaded through the first transverse aperture 24b on clamp corner 14. Then, said first transverse bolt 29a is threaded through the first transverse aperture 24a on clamp corner 12 and the first transverse bolt 29a is finally secured with a first transverse lock nut 30a. Next, a second transverse bolt 29b is threaded through the second transverse aperture 28b on clamp corner 14. Then, said second transverse bolt 29b is threaded through the second transverse aperture 28a on clamp corner 12. Next, the second transverse bolt 29b is then finally secured with a second transverse lock nut 30b. Similarly, to secure together clamp corners 16 and 18 to form second clamp half 22, a third transverse bolt 29c is threaded through the first transverse aperture 24d on clamp corner 18. Then, said third transverse bolt 29c is threaded through the first transverse aperture 24c on clamp corner 16. Next, the third transverse bolt 29c is secured with a third transverse lock nut 30c. Next a fourth transverse bolt 29d is threaded through the second transverse aperture 28d on clamp corner 18. Then, said fourth transverse bolt 29d is threaded through the second transverse aperture 28c on clamp corner 16. Finally, the fourth transverse bolt 29d is then secured with a fourth transverse lock nut 30d.

Figure 2:
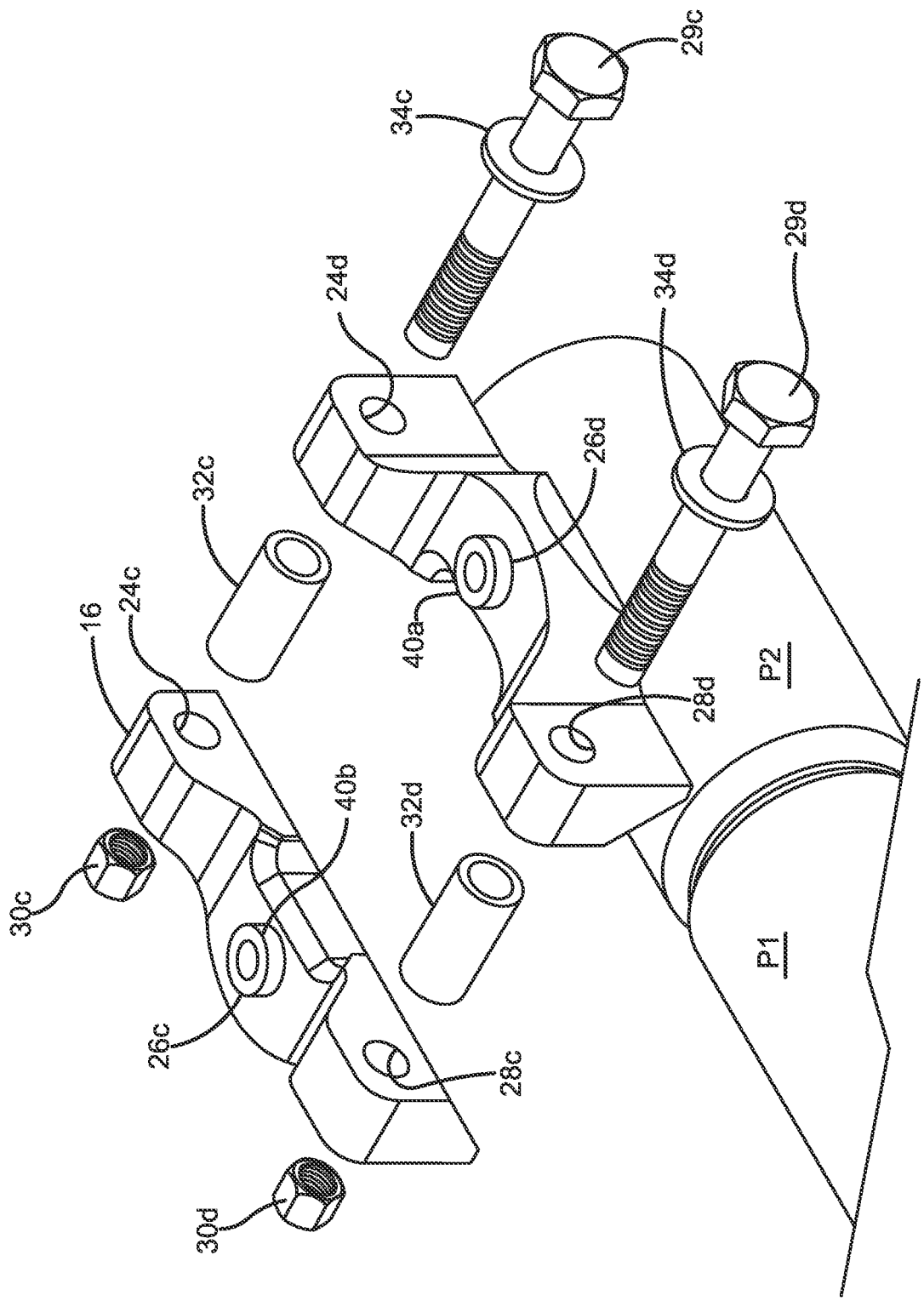
FIG. 2 shows an exploded view of two of the four corners of the adjustable pipe clamp of the present invention prior to the two corners being secured together to form one half of the adjustable clamp of the present invention and prior to the one half being secured around two ends of a pipe to be welded together.
Figure 3:
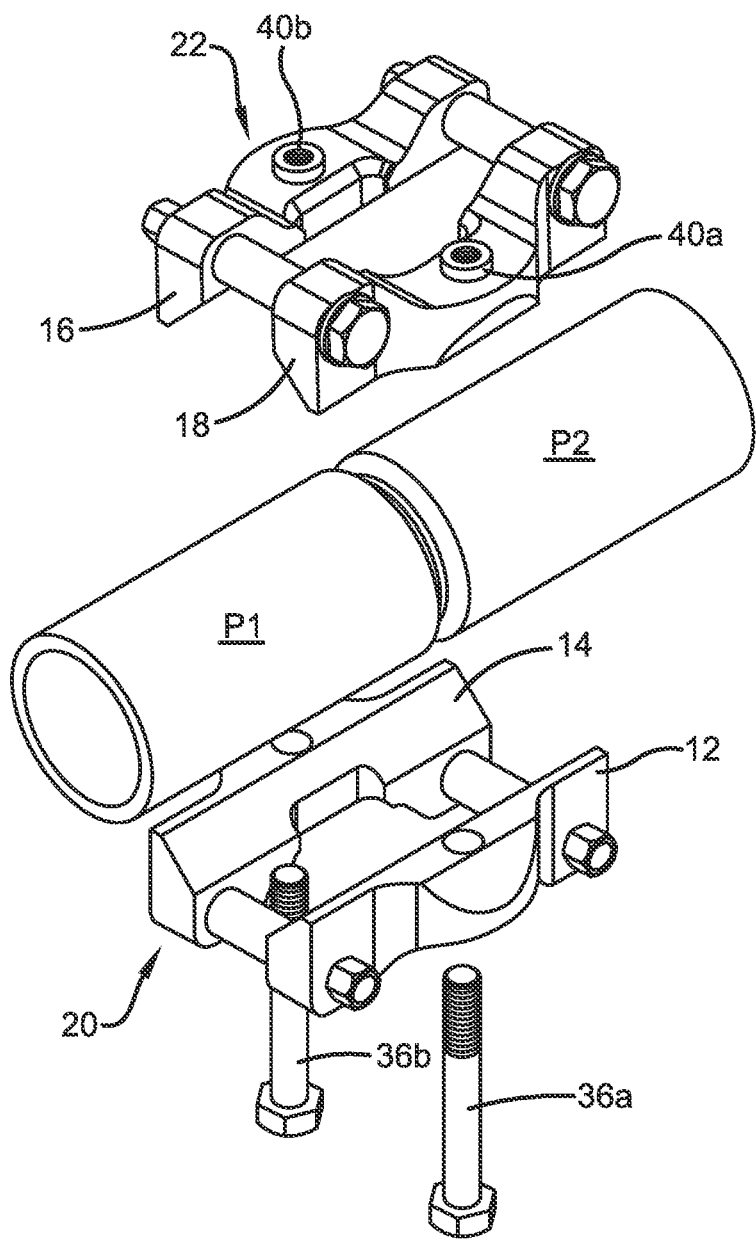
FIG. 3 shows the two halves of the adjustable pipe clamp of the present invention prior to being secured together around two ends of a pipe to be welded together.

As shown in FIG. 1, also present between the clamp corners 12 and 14 is a first spacer 32a and a second spacer 32b. Similarly, there is also present a third spacer 32c and a fourth spacer 32d between the clamp corners 16 and 18 as best shown in FIG. 2. A washer 34a-d is placed between the head of respective transverse bolts 29a-d and the clamp corner to which it is secured as best shown in FIG. 1.

For any given adaptation of the adjustable pipe clamp 10, the spacers 32a-d will be the same size. The size of the particular spacers 32a-d selected to be placed within clamp 10 will depend upon the size of the pipes P1 and P2 to be welded together. The clamp 10 of the present invention can accommodate pipes with a diameter between 1.5 and 6 inches, with the spacers 32a-d being sized to fit pipes between that range of diameters, with a new set of spacers being used for each half-inch diameter between said range of 1.5 to 6 inches. In one embodiment, to accommodate welding together pipes with a diameter of 1.25 inches, the spacers 32a-d will be about 0.16 inches in length. In another embodiment, to accommodate welding together pipes with a diameter of 1.5 inches, the spacers 32a-d will be about 0.40 inches in length. In an additional embodiment, to accommodate welding together pipes with a diameter of 2 inches, the spacers 32a-d will be about 0.875 inches in length. In yet another embodiment, to accommodate welding together pipes with a diameter of 2.5 inches, the spacers 32a-d will be about 1.375 inches in length.

Figure 4:
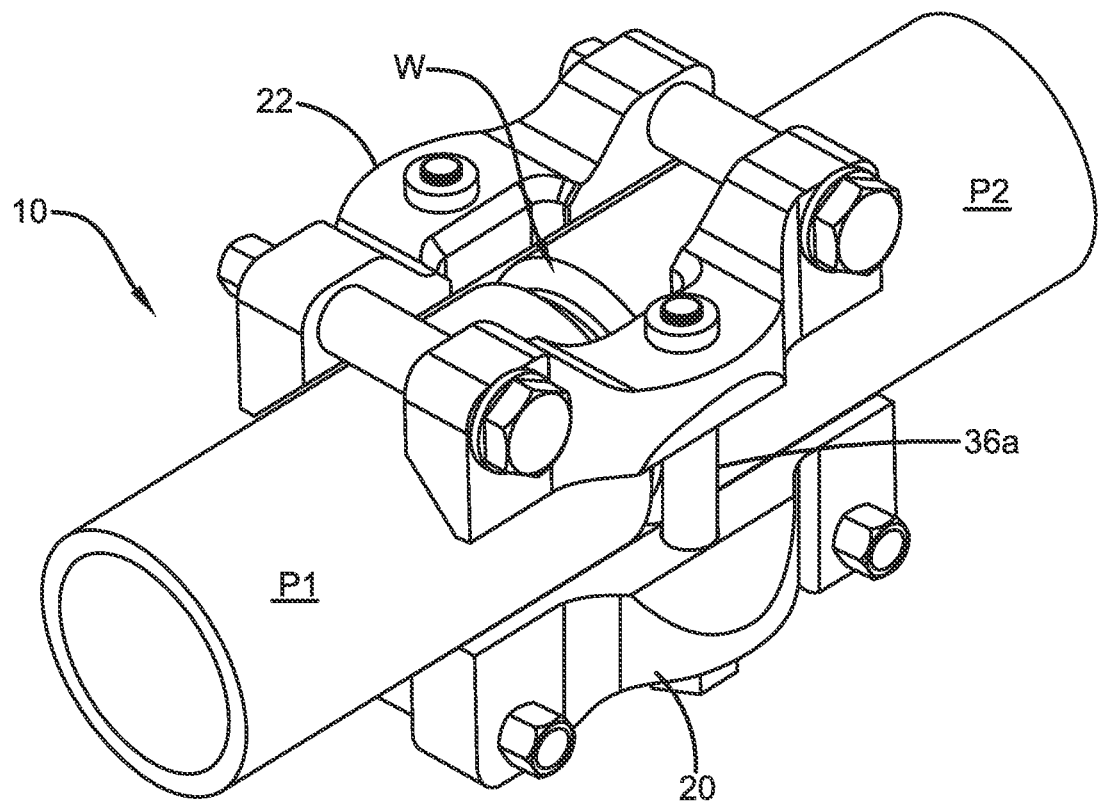
FIG. 4 shows the two halves of the adjustable pipe clamp of the present invention secured together around two ends of a pipe to be welded together.

Once the clamp corners 12 and 14 have been secured together to form the first clamp half 20 and the clamp corners 16 and 18 have been secured together to form the second clamp half 22, the first and second clamp halves 20 and 22 can be secured together to form the clamp 10 as shown in FIG. 4. To do this, a pair of parallel bolts 36a and 36b, with accompanying washers 38a and 38b, are placed through the parallel apertures 26a and 26b of the first clamp half 20; then a pair of threaded inserts 40a and 40b are placed within the parallel apertures 26b and 26c of the second clamp half 22, and finally the parallel bolts 36a and 36b are secured within the threaded inserts 40a and 40b to form the clamp 10. Although the embodiment above was discussed with the parallel bolts 36a and 36b being first placed within the first clamp half 20, it is also envisioned by the present invention that the parallel bolts 36a and 36b could be first placed within the second clamp half 22.

In one or more embodiments, the transverse bolts 29a-d are a first length and the parallel bolts 36a-b are a second length, wherein the first length is shorter than the second length.

Once the clamp 10 is secured in place around the pipes P1 and P2, the clamp forms a weld window W that allows for a user to then proceed to tack weld together the pipes P1 and P2. Although not shown in the drawings, there is also a second weld window formed by the clamp 10 on the opposite side clamp 10 which also allows for a tack weld to take place. Once the tack welding has taken place within the weld windows W, the clamp 10 is removed and then the weld can be finished around the entire connection between the two pipes P1 and P2.

In one or more embodiments, the clamp corners 12, 14, 16, and 18 are made from preheated 4140 steel, and prior to use, the clamp corners 12, 14, 16, and 18 are then electroless nickel plated. In one or more embodiments, the spacers 32a-d are cut to length from a tube made from 4130 steel.

In light of the foregoing, it should be appreciated that the present invention significantly advances the art by providing an adjustable pipe clamp and method of using the same that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An adjustable clamp for welding together ends of two pipes, wherein the adjustable clamp has a first axis perpendicular to the pipes and a second axis parallel to the pipes, the adjustable clamp comprising:

a. four clamp corners, wherein each clamp corner includes a first transverse aperture, a second transverse aperture, and a third parallel aperture between said first and second transverse apertures, wherein the first and second transverse apertures are transverse relative to the first axis and the third parallel aperture is parallel relative to the first axis;
   b. four transverse bolts securable within the first and second transverse apertures of the four clamp corners;
   c. two parallel bolts securable within the third parallel apertures of the four clamp corners;
   d. a threaded insert placeable within the third parallel apertures of each of two of the four clamp corners, wherein each threaded insert is mated with a respective parallel bolt;
   e. four spacers, each said spacer surrounding a portion of each transverse bolt;
   f. each of said four clamp corners having a pipe-facing face angled at 45° to said first and second axes; and
   g. a pair of windows, each said window formed by an opposing pair of said transverse bolts securing together an opposing pair of said clamp corners and forming a clamp half, said pair of windows fixed opposite each other by said parallel bolts secured within said third apertures of each said clamp half, said windows exposing and accommodating welding access to the ends of the two pipes to be welded together, said two pipes being received and longitudinally engaged by said pipe-facing faces of said clamp corners, said pipe-facing faces bridging said ends of the two pipes.

2. The adjustable clamp of claim 1, further comprising four transverse lock nuts, wherein each transverse lock nut is mated with a respective transverse bolt.

3. The adjustable clamp of claim 1, further comprising four transverse washers, wherein each transverse washer is placed adjacent a head of a respective transverse bolt.

4. The adjustable clamp of claim 1, further comprising two parallel washers, wherein each parallel washer is placed adjacent a head of a respective parallel bolt.

5. The adjustable clamp of claim 1, wherein each spacer of the four spacers has a same spacer length.

6. The adjustable clamp of claim 5, wherein said spacer length is selected from 0.16 inches, 0.40 inches, 0.875 inches, or 1.375 inches.

* * * * *